Patented Oct. 11, 1932

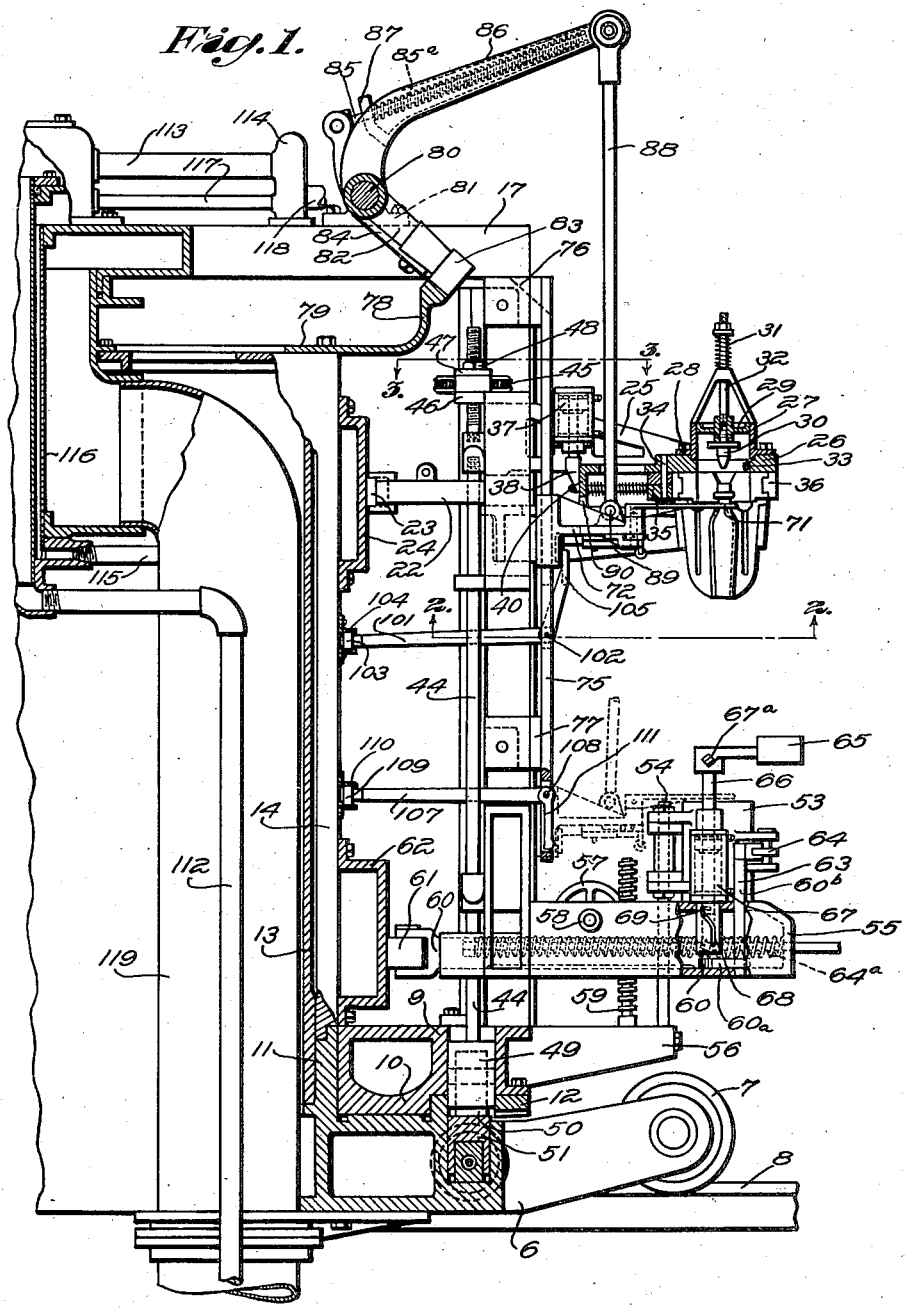

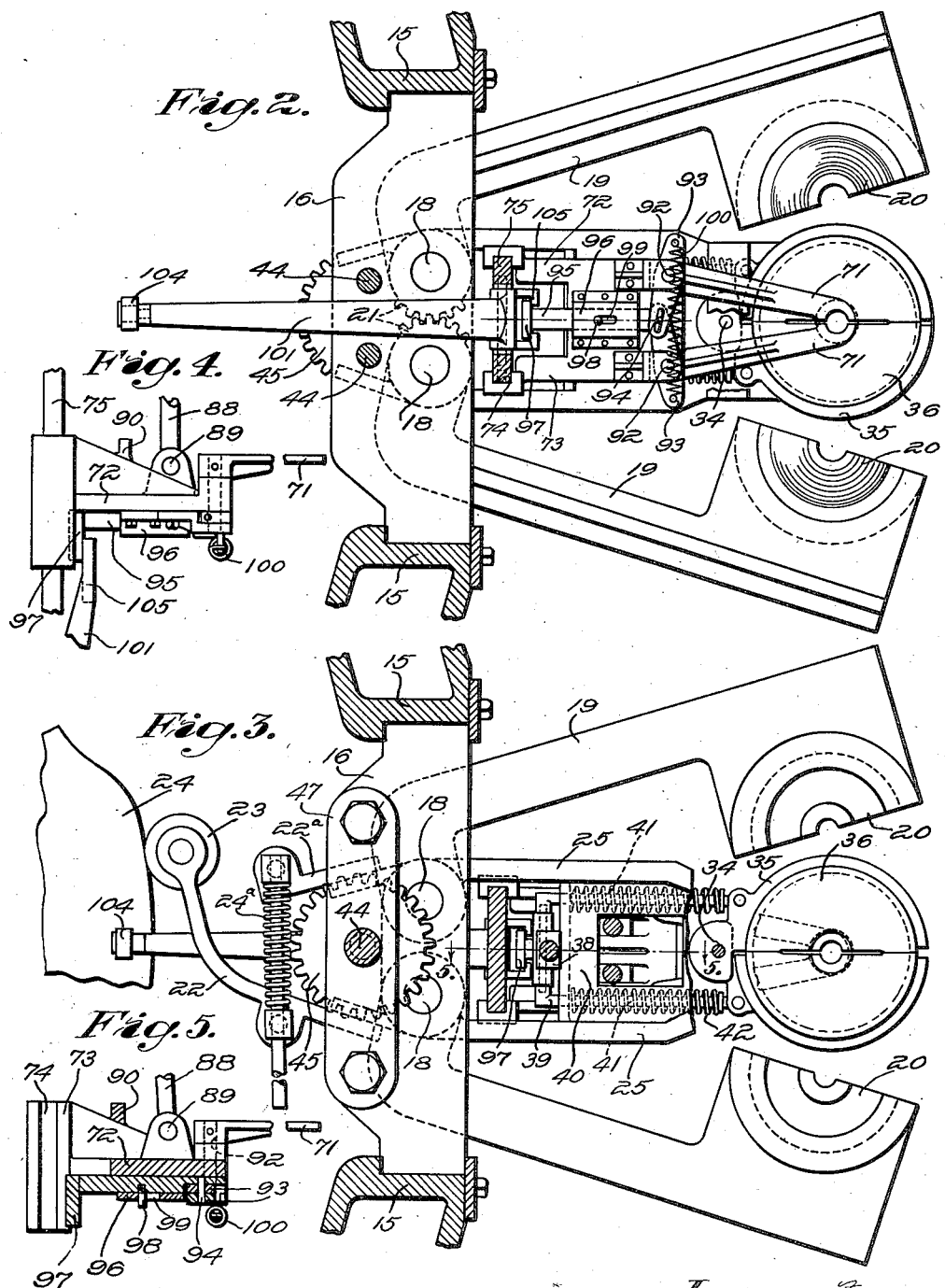

1,882,091

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

TRANSFER MECHANISM FOR ROTARY GLASSWARE FORMING MACHINES

Application filed December 31, 1929. Serial No. 417,749.

My invention relates to rotary glassware forming machines and particularly to mechanism for transferring a parison vertically from a glass shaping mold at one level to another glass shaping mold at another level.

One mode of procedure which is employed in forming articles of glassware consists in supplying a charge of glass to a parison mold and associated neck mold and giving the charge a preliminary shape to form a parison, and thereafter transferring the parison to a finishing mold in which it is blown to final shape. The parison and neck molds may be charged with glass from a feeder, by suction or in any known manner, and the charge formed into a parison therein. The formed parison then may be transferred to a finishing mold, located below the parison forming unit, by opening the parison mold, leaving the parison suspended from the neck mold, and either bodily moving the neck mold and associated structure downwardly between the sections of the open parison mold into a position to permit the finishing mold to be closed about the parison in the manner shown in the co-pending application of Frank H. Lobb, Ser. No. 465,440, filed April 29, 1921; or by bodily raising the finishing mold upwardly between the sections of the parison mold and closing the finishing mold about the parison, as in the well known Owens process.

Such methods of transfer are relatively inefficient because vertical movements of relatively heavy mold units are required, and the structure for producing such movements necessarily is complicated and cumbersome. Moreover, unless the neck mold and blow mold supports are held in vertically fixed positions relatively to each other, it is difficult to secure air tight joints between said molds, when they are closed, at least without making special provision to that end.

It is an object of the present invention to provide a novel construction of means for transferring a parison vertically from a parison mold to a relatively fixed finishing mold, without the necessity of imparting vertical movement to either the finishing mold or the neck mold and associated mechanism during the transfer operation. For the accomplishment of this object, a pair of transfer tongs may be provided operating in properly timed relation to the operation of the other parts of the machine, to loosely close about or grip a parison left suspended from the neck mold by the opening of the parison mold, to move the parison vertically into a position to permit the finishing mold to close about the parison, and to release the parison in the finishing mold for final blowing. Thus, a comparatively light weight construction may be employed for transferring the parison as a result of which the construction of the machine is greatly simplified, the synchronism of the transfer mechanism with the other parts of the machine may more readily be effected, and the machine operated more rapidly and more efficiently. Furthermore, the necessity for special provision to secure an air-tight joint between the molds when they are closed, is obviated.

Another object of this invention is to provide a novel construction of means of the above character including tongs transfer mechanism for transferring a parison from a parison forming unit at one level, to a finishing mold at a lower level.

More specifically, it is an object of this invention to provide a novel continuous one-table glassware forming machine including a transfer tongs mechanism for transferring a bare parison from a parison mold unit downwardly into a finishing mold, located beneath the parison mold unit, while maintaining the parison in upright position, thus avoiding strains therein.

Other objects and advantages of the invention will be pointed out in the detailed description thereof which follows, or will become apparent from such description.

In order that the invention may readily be understood, reference should be had to the accompanying drawings in which I have illustrated one embodiment thereof.

In said drawings:

Figure 1 is a view partly in longitudinal sectional elevation of a portion of a continuous one-table forming machine embodying the invention, said view being taken through the machine in a radial plane near the beginning of the transfer zone;

Fig. 2 is an enlarged view, principally in bottom plan, but partly in horizontal transverse section, of a portion of the apparatus shown in Fig. 1, and taken on the line 2—2 of Fig. 1;

Fig. 3 is a view similar to Fig. 2, but taken in top plan on the line 3—3 of Fig. 1;

Fig. 4 is an enlarged view in elevation of a fragmentary portion of the transfer tongs and associated mechanism; and Fig. 5 is a view similar to Fig. 4, but partly in longitudinal vertical section and taken on the line 5—5 of Fig. 3.

Considering generally the embodiment of the invention illustrated in the drawings, a continuous one-table suction machine is shown by way of example, in which the novel transfer mechanism of this invention is provided. The machine may be of the general type shown in the British patent to Hillmann, No. 172,947 of July 13, 1922. As illustrated in the drawings and as shown in the Hillmann patent, my machine embodies a plurality of parison forming units and a corresponding number of companion finishing molds, but inasmuch as said units and molds are identical in construction, only one parison forming unit and the associated finishing mold are illustrated herein. The parison forming unit includes a sectional parison mold, a sectional neck mold, and a suction and blowhead structure, all mounted on a vertical ram which is operated to dip the parison mold into a suitable gathering pool, not shown, whereby the molds may be filled with glass by suction. The finishing mold is suitably supported on the rotary table some distance below the parison forming unit and is provided with mechanism for opening and closing the mold at appropriate times.

My novel transfer mechanism includes a pair of tongs carried by a slide or carriage mounted on a vertical guide. The slide, in turn, has cam controlled mechanism connected thereto for moving the slide and the tongs upwardly into a position to close about the parison, and downwardly to lower the parison into a position to be enclosed by the finishing mold. The tongs operating mechanism preferably includes means for opening and closing the tongs with a snap action, and for holding the tongs closed or open. When the formation of a parison has been completed, the tongs are elevated, and closed about the parison by the operation of cam controlled mechanism. As the machine continues to rotate, the tongs are lowered toward the finishing mold to position the parison between the sections of the mold, after which the finishing mold is closed about the parison. Thereupon, additional cam controlled mechanism operates to open the tongs after which the tongs are removed from the finishing mold and a blowhead engages the finishing mold to blow the parison to final shape. The various operating cams are mounted on an adjustable segment and mechanisms associated therewith are operated at timed intervals by the rotation of the table.

Referring in detail to the drawings:

The machine comprises a frame 6 provided with wheels 7 on supporting rails 8, and which can be moved toward and away from a suitable bath or gathering pool, not shown. Rotatably mounted on the base or frame 6 of the machine is the table 9 which includes an annular slide member 10 which fits in an annular slideway formed in the frame of the machine, and slidably engages the column 11. A ring gear 12 is secured to the under side of the bed plate 9, by means of which the machine is continuously rotated by mechanism not part of the present invention, but illustrated for example in the aforesaid patent to Hillmann. Rigidly secured to the column 11 is an inner cylinder 13 which supports fixed and adjustable segments, the latter 14 only being shown. The segment 14 which carries a plurality of cams thereafter described is adjustable angularly about the cylinder 13 by any suitable mechanism, not illustrated, but which may be similar to that shown in the Hillmann patent.

Secured to the bed plate 9 in spaced relation to each other are vertical supports and guides 15 between which a ram or slide 16 is movably mounted. The members 15 serve to support a spider 17, the outer ends of which are suitably connected to the upper ends of said members.

The slide or ram 16 carries a pair of pivot pins 18 upon which the holders 19 for the sections 20 of the parison mold, are rockingly mounted. The sections 20 of the parison mold may be interchanged with other sections of different lengths, depending upon the length of the finishing mold which is used. The holders 19 are interconnected by means of segmental gears 21 formed on the hubs of the holders, and causing joint operation thereof. The mold is opened at the appropriate times by means of an arm 22 secured to one of the holders and carrying a roller 23 which engages a cam 24 on the segment 14. When the roller 23 leaves cam 24, the mold is closed by a compression spring 24a interposed between arm 22 on the one holder, and an arm 22a on the other holder, as will be obvious from Fig. 3.

The slide or ram 16 carries a pair of outwardly extending brackets 25. The brackets 25 constitute branches of an integral U-shaped casting supported on the pivot pins 18 above the parison mold holders 19. At their outer ends, the brackets 25 support a vacuum and blowhead structure 26. The head 26 carries a cylinder 27 removably fastened thereto as indicated at 28. Located in cylinder 27 is a piston 29 which carries the neck pin 30. The neck pin normally is held retracted by means of a compression spring 31 which encircles the upper end of piston rod 32 which extends through the upper end of the cylinder 27. When vacuum is applied to the mold, as for example through a port 33, in the head 26, the piston 29 is drawn downwardly, lowering the neck pin into operative position. When the application of vacuum is terminated, and/or preliminary blowing pressure is admitted through ports 33, piston 29 is elevated as will be understood. If preliminary blowing pressure is employed, the charge may be supported by the shear blade, in known manner, or by means of a recessed bottom plate, as shown in my co-pending application, Ser. No. 316,982, filed November 3, 1928.

Extending downwardly from the head 26 is a pivot pin 34 upon which the holders 35 for the neck mold sections 36 are rockingly mounted. The neck mold is opened or closed by means of an air motor 37 suitably supported upon the brackets 25, and operated by the admission and exhaust of fluid pressure to or from the opposite ends thereof by means of suitable timed valve mechanism, not shown. Mounted on the bottom end of the piston rod of the air motor is a wedge 38 which extends downwardly between the transverse portion of a U-shaped neck mold operating member 39, and a transverse angular web 40 extending between the brackets. The member 39 is slidably mounted in the web and the spaced horizontal arms 41 thereof are pivotally connected at their outer ends to the holders 35 for the neck mold sections. Compression springs 42 encircle the arms 41 and bear against the web 40 at their inner ends and against collars on the arms 41 at their outer ends.

Thus, it will be seen that when the wedge 38 is forced downwardly by the operation of air motor 37, the operating member 39 will be retracted inwardly opening the neck mold; but when the wedge 38 is elevated, the compression springs 42 will force the neck mold closed.

The dipping movement of the parison mold unit is controlled by means of mechanism substantially the same as that illustrated in the patent to Hillmann, which mechanism is as follows: The ram or slide 16 is adjustably connected to a vertical rod 44, the upper end of which has screw-threaded connection with a worm gear 45, located between a rearwardly extending lug 46, and a cross bar 47 connected to said lug. Mechanism not shown herein, but illustrated in the Hillmann patent, is connected to worm gear 45 for adjusting the extent of dip according to the length of the parison mold employed. A lock nut 48 on the upper end of the rod 44 is employed for setting the adjustment of the rod. The bottom end of rod 44 engages a slide 49 mounted in a vertical opening formed in the annular portion 10 of the table 9, and carrying a roller 50 which engages a circular cam 51. The cam 51 is properly laid out to secure the desired lowering and raising movement of the parison mold unit during the dipping operation, and may include an adjustable portion, such as is disclosed in the patent to Hillmann.

Considering now the construction and arrangement of the finishing mold, it will be seen that the holders 53 for the sections thereof are mounted upon a vertical pivot pin 54. The finishing mold may be interchangeable with other molds of different lengths, the inter-changeable parison molds being of corresponding lengths, as stated above. The pivot pin 54 extends upwardly through a support 55 for the mold operating mechanism, and is adjustably secured at its lower end in a bracket 56 extending outwardly from the table 9 of the machine. The support 55 is slidably mounted between the guides 15, previously referred to, and may be adjusted vertically by means of a hand wheel 57 mounted on a shaft 58 journaled in the support. The shaft 58 carries a worm gear (not shown) which meshes with a vertical threaded spindle 59 arising from bracket 56, which carries the weight of the support. The support 55 is adjusted when a longer or shorter finishing mold is substituted for the one in use, so that the top of the finishing mold will always be at the same level and the lower limit of movement of the transfer mechanism need not be varied.

The finishing mold is opened or closed by means of a rack 60, the inner end of which carries a roller 61 engaging a cam 62 on segment 14 for opening the mold. The rack 60 meshes with segmental gears, one of which is shown at 60a, on the lower ends of crankshafts of which one is shown at 60b. These shafts carry crank arms, one of which is shown at 63, each crank arm being connected by a link 64 to one of the holders 53. The mold is closed when roller 61 leaves cam 62, by means of a compression spring 64a. The mechanism for operating the finishing mold and for adjusting its level is substantially identical with that disclosed in the patent to Hillmann referred to above.

Mounted on the support 55 is a blowhead 65. The blowhead 65 is carried by an arm adjustably secured to a rod 66 by a set screw 67a for adjusting the head for engaging molds of different lengths. The rod 66 is reciprocated by an air motor 67, and simultaneously rotated by a barrel cam 68 with which engages a pin 69 on a downwardly extending rod 70 of the air motor. Air pressure is admitted to and exhausted from the air motor 67 by suitable time controlled valve mechanism, not shown, to cause said blowhead to move in a helical path into and out of engagement with the finishing mold. The blowhead mechanism is similar to that shown in British Patent No. 257,637 Sept. 7, 1926, granted to the Hartford-Empire Company.

We now come to consider the transfer mechanism. Said mechanism comprises a pair of tongs or grippers 71, mounted upon a carriage or slide 72 and shaped to grip or to merely enclose the parison. The carriage 72 is cut away on its inner end to provide a pair of spaced arms 73, having vertical guideways 74 provided therein. By means of these guideways, the carriage 72 embraces and is slidably mounted upon a vertical guide 75, secured at its upper and lower ends respectively to transverse members 76 and 77, extending between the supports 15.

The carriage 72 is raised and lowered on the guide 75 to raise the tongs into a position to close about a parison suspended from the neck mold, and to lower the tongs with the parison toward the finishing mold. The raising and lowering movements of the carriage 72 are controlled by means of a circular cam 78, formed on the outer edge of an annular plate 79, secured to the top of the segment 14 and angularly adjustable thereby. The remaining portion of the cam (not shown) is supported by the non-adjustable segment previously referred to, but not illustrated in the drawings.

Motion is transmitted from cam 78 to the carriage 72 by the following mechanism: Mounted upon a pivot pin 80, suitably supported by a bearing 81 carried by the spider 17, is a bifurcated lever 82. Lever 82 carries a roller 83 engaging cam 78, and is connected by means of a leaf spring 84 and a rod 85 pivotally connected to the leaf spring, to a bifurcated tubular lever 86, also rockingly mounted upon the pivot pin 80. The rod 85 extends through an opening in a web 87 formed in the inner end of the tubular lever 86, and is yieldingly connected to said lever by means of a compression spring 85a encircling the rod 85 and bearing against the web 87 at its inner end and against a nut on the outer end of the rod at its outer end, all as indicated in Fig. 1. Pivotally connected to the outer end of lever 86 is a downwardly extending rod 88, the bottom end of which is joined by a pivot 89 to the carriage 72.

The circular cam 78 is laid out to produce the desired vertical movements of the carriage 72 and the tongs at appropriate times. Thus, said cam is shaped to hold the tongs mechanism at such a level that said mechanism will pass beneath the container for the gathering pool during the gathering period. The portion of the cam 78 shown in Fig. 1, is a high portion thereof for holding the carriage in its uppermost position to permit the tongs to close about a parison suspended from the neck mold. The upward movement of the carriage is limited by means of a stop 90 formed on the carriage which engages the bottom portion of the web 40, previously referred to. The yielding connections between the lever 82 and the lever 86 prevents shock to the tongs slide reciprocating mechanism when the stop 90 strikes the web 40, and permits variation in the upper position of the tongs to accord with variation in positions of the neck mold. The downward movement of the carriage 72 is limited by the contour of cam 78 and the lower limit of movement thereof is not varied but maintained at the same level, as also is the top of the finishing mold, as already stated.

Considering now the construction of the tongs and the mechanism for closing the tongs when they are in their uppermost position, and for opening the tongs when they are in their lowermost position, it will be seen that the grippers or encircling jaws 71 are mounted at their inner ends upon vertical pivot pins 92 suitably journaled in the carriage or slide 72. The grippers 71 are secured to the upper ends of the pivot pins 92 above the top of the carriage 72. Also secured to the pivot pins 92 beneath the bottom of carriage 72 are toggle levers 93. The inner ends of levers 93 overlap and are slotted to receive a pin 94 mounted in the outer end of a slide member 95 mounted for reciprocation in a slideway. Said slideway is provided by a channel-like member 96 secured to the bottom side of the carriage 72. Formed on the inner end of the slide member 95 is an enlarged head 97. Head 97 is engaged at appropriate time by either of two operating mechanisms, for opening or closing the tongs, as will be described hereinafter.

It will be observed that outward movement of the slide member 95 will operate the toggle levers 93 in a direction to open the tongs, and inward movement thereof will operate the said levers in a direction to close the tongs. Inward and outward movement of the slide member 95 is limited by a pin 98 mounted in the slide member and extending downwardly through a slot 99 provided in the channel member 96. The tongs are opened or closed with a snap action by means of a tension spring 100, the opposite ends of which are connected to the outer end of the toggle levers 93, as is clearly shown in Fig. 2; but the principal function of spring 100 is yieldingly to hold the tongs in open or closed position.

When the tongs carriage 72 has been moved to its uppermost position, as shown in Fig. 1, the tongs are closed by the operation of a bell crank lever 101. The bell crank lever 101 is pivotally mounted at 102 in an opening formed in the guide 75 and carries a cam roller 103 on its inner arm, which roller engages a cam 104 provided on the adjustable segment 14. The outer arm of the bell crank lever 101 is bifurcated to provide a pair of spaced fingers 105 having inwardly turned ends, as shown in Figs. 2 and 3. The arrangement of the fingers 105 is such that when the tongs carriage 72 is moved into its uppermost position, the head 97 moves into interlocking relation with said fingers. The cam 104 is laid out so that at the appropriate time, bell crank lever 101 is rocked in a direction to move the outer bifurcated arm thereof inwardly, which serves to pull the slide member 95 inwardly, closing the tongs, which are held closed by spring 100. Subsequently, the tongs carriage 72 is moved downwardly disengaging the head 97 of slide member 95 and the spaced fingers 105.

When the tongs carriage 72 has reached its lowermost position, the parison supported thereby will be in a position to be enclosed by the finishing mold. The finishing mold is closed about the parison, and the tongs are opened by means of a bell crank lever 107. The bell crank lever 107 is pivoted at 108 in an opening formed in the bottom portion of guide 75, and a cam roller 109 mounted on the inner arm thereof engages a cam 110 mounted on the segment 14. The outer downwardly extending arm 111 of bell crank lever 107 normally is held in a vertical position; but at the required time, bell crank lever is rocked about its pivot to move the arm 111 outwardly into engagement with the head 97 of slide member 95, which causes the tongs to be opened, which are held open by spring 100. The tongs carriage 72 now is moved upwardly to an intermediate position and blowhead 65 engages the top of the finishing mold to blow the parison to final shape.

The supply of vacuum, blowing air, and cooling air may be provided for in substantially the same manner as in the construction shown in the aforesaid patent to Hillmann. Thus, vacuum conduit 112 is provided which communicates through a casing with a horizontal conduit 113, leading to a two-way valve 114; and preliminary blowing air may be conducted to said valve through conduits 115, 116, and 117, the latter of which also leads to valve 114. However, instead of providing communication between the discharge conduit 118 of valve 114 and the head 26 through the bearing 81, hollow pin 80, lever 86, etc., a suitable flexible conduit (not shown) preferably is interposed between conduit 118 and the port 33 of the head 26 for such purpose. Valve 114 may be operated in any suitable manner, as for example by means of a cam controlled bell crank lever, not shown.

A cooling air conduit 119, similar to that shown in the aforesaid patent to Hillmann, and similarly adapted to distribute cooling air to the various molds, likewise may be provided. Blowing air may be supplied to blowhead 65 at appropriate times in any manner, as desired.

The operation of the machine hereinbefore described, briefly is as follows:

The table 9 continuously is rotated by the driving mechanism including the ring gear 12. As the parison forming unit is moved over the edge of the container for the gathering pool (not shown), the ram or slide 16 is lowered through the coaction of cam roller 50 with the cam 51, dipping the bottom of the parison mold into the pool of glass. At this time, vacuum is admitted into head 26 through port 33 to fill the parison and neck molds by suction, piston 29 being drawn downwardly to depress the neck pin 30. When the molds have been filled, the ram or slide 16 is elevated removing the parison mold from contact with the glass, the tail of glass depending from the charge being severed by means of a shear blade, (not shown). Thereupon, the application of vacuum is terminated, and if desired, preliminary blowing pressure is admitted through port 33 by the proper operation of valve 114 to shape, or assist in shaping, the charge of glass into a parison.

As the machine continues to rotate, and the formation of the parison is completed, the cooperation of roller 23 with cam 24 opens the parison mold, leaving the parison suspended from the neck mold. Meanwhile, the tongs carriage 72 which will have been held a sufficient distance below the parison mold unit to permit it to clear the container for the gathering pool, during the gathering period, will have begun its upward movement as a result of roller 83 riding up the upwardly inclined portion of cam 78. As the parison mold is opened, the carriage 72 is moved into its uppermost position until stop 90 strikes the web 40, as previously explained.

After the carriage 72 has reached its uppermost position, the tongs are closed with a snap action by the operation of bell crank lever 101, and the neck mold is opened releasing the parison in the tongs which now may be moved downwardly. As the machine continues to rotate, the tongs are lowered until the parison supported thereby is moved into a position to be enclosed by the finishing mold. The finishing mold now is closed about the parison by the cooperation of roller 61 with cam 62, and the tongs are opened with a snap action by a downward swinging movement of bell crank lever 107 imparted thereto by cam 110. The tongs carriage 72 now is elevated to its initial position, or to a level below the parison mold where it will clear the container for the gathering pool, and blowhead 65 is swung downwardly into engagement with the finishing mold so that final blowing air may be applied to the parison to blow it to final shape. Upon completion of the blowing operation, the blowhead is swung upwardly out of engagement with the finishing mold, the finishing mold is opened, and the finished article is removed from the mold at the delivery station.

Various changes may be made in the details of construction of the machine illustrated and described herein, and in the mode of operation thereof. Although I have illustrated the invention as embodied in a suction forming machine, it will be understood that it may be employed to equal advantage in machines to which glass is fed in gobs, or otherwise. Nor is the invention limited to use in a one-table forming machine, but may be employed in any type of machine wherein it is desired to transfer vertically a parison, blank, or article of glassware, between molds at different levels.

Having thus described my invention, what I desire to claim and to secure by Letters Patent is:

1. Apparatus for fabricating glassware comprising a pair of glass shaping molds, means for carrying the molds at different levels, means permanently associated with the upper mold for supporting a glass article when the mold is opened, said molds being supported in vertical alignment, transfer tongs for automatically transferring a glass article vertically downwardly from the upper mold to the lower mold, and means for confining the transferring movement of said tongs to a vertical path between the molds.

2. Apparatus for fabricating glassware comprising a sectional parison mold and a finished mold, means for carrying said molds at different levels, a sectional neck mold associated with said parison mold, transfer tongs for automatically transferring a parison vertically from the parison mold to the finishing mold, means for permanently carrying said tongs in vertical alignment with the finishing mold and for carrying said tongs into a position to close about a parison left suspended from the neck mold when the parison mold opens, and means for vertically moving said tongs.

3. Apparatus for fabricating glassware comprising a parison mold and a finishing mold, means for continuously rotating said molds, a neck mold associated with said parison mold and held in vertically fixed position with respect thereto, means for supporting said molds at different levels, transfer tongs for automatically transferring a parison vertically from the parison mold to the finishing mold, means for supporting said tongs for opening and closing movements about an axis located radially inward of the axis of said parison mold, and means for vertically moving said supporting means and tongs carried thereby.

4. Apparatus for fabricating glassware, comprising a parison mold unit and a finishing mold, means for carrying said mold unit and said finishing mold at different levels, said parison mold unit including a neck mold and a parison mold, means for forming a parison in said mold unit, means for opening the parison mold leaving the parison suspended from the neck mold, transfer tongs for transferring the parison from the parison mold unit to the finishing mold, means for closing the tongs about the suspended parison, means for opening the neck mold releasing the parison in upright position in the tongs, means for moving the tongs holding the parison vertically upright, to position the parison in the previously opened finishing mold, and means for closing the finishing mold about the parison.

5. Apparatus for fabricating glassware, comprising a parison forming unit and finishing mold, means for carrying said unit and said mold at different levels, means for moving said unit toward and away from a gathering pool to gather a charge of glass for a parison by suction, means for forming the charge of glass into a parison in said unit, transfer tongs for automatically transferring said parison vertically from the parison forming unit to the finishing mold, means for closing the tongs about the parison for the removal thereof from the parison forming unit, and for opening the tongs for the release of the parison to the finishing mold, and means for subsequently blowing the parison to final shape in the finishing mold.

6. Apparatus for fabricating glassware, comprising a continuously rotating mold table, a parison forming unit mounted on said table at one level, a finishing mold mounted on said table at a lower level, said parison forming unit including a neck mold and a parison mold, means for forming a parison in the parison forming unit, transfer tongs for transferring the parison from the parison forming unit to the finishing mold, cam controlled mechanism for vertically reciprocating said tongs, said mechanism operating to move said tongs into a position to close about a parison left suspended from the neck mold by the opening of the parison mold, and to lower the tongs and parison into a position to permit the finishing mold to be closed about the parison, cam controlled mechanism for closing the tongs about the suspended parison, and cam controlled mechanism for opening the tongs to release the parison in the finishing mold.

7. Apparatus for fabricating glassware, comprising a continuously rotating mold table, a parison forming unit mounted on said table at one level, a finishing mold mounted on said table at a lower level, said parison forming unit including a neck mold and a parison mold, means for moving said unit toward and away from a gathering pool to fill the molds with glass by suction, means for opening the parison mold leaving the previously formed parison suspended from the neck mold, transfer tongs for transferring the parison from the parison forming unit to the finishing mold, a carriage for supporting said tongs, said carriage being mounted on a vertical guide, cam controlled mechanism for vertically reciprocating said carriage, said mechanism operating to raise said carriage into a position to permit the tongs to close about the suspended parison, means for limiting the upward movement of said carriage and tongs, means for closing the tongs about the suspended parison, said last named means being operatively connected to the tongs by the movement of the carriage into its uppermost position, and disconnected from the tongs upon downward movement of the carriage, and separate means for opening the tongs when the carriage is in its lowermost position to release the parison in the finishing mold, the last named means being operatively connected to the tongs upon movement of the carriage into its lowermost position, and disconnected from the tongs upon upward movement of said carriage.

8. Apparatus for fabricating glassware comprising a sectional parison mold and a finishing mold, means for carrying said molds at different levels, means for continuously rotating said molds, a neck mold associated with said parison mold and held in vertically fixed position with respect thereto, transfer tongs for automatically transferring a parison vertically from the parison mold to the finishing mold, means for permanently holding said tongs in vertical alignment with the finishing mold, and for carrying said tongs into a position to be closed about a parison left suspended from the neck mold when the parison mold opens, means for closing the tongs about the parison, means for vertically moving the tongs and parison relative to the neck mold and parison mold to position the parison in the finishing mold, means for opening the tongs to release the parison in the finishing mold, and means for subsequently blowing the parison to final shape in the finishing mold.

9. Apparatus for forming glassware comprising a mold table, means for continuously rotating said table, a parison forming unit carried by said table, said unit including a parison mold, a neck mold above the parison mold, and a suction head above the neck mold, means for moving said parison forming unit into a position to gather a charge of glass by suction from the surface of the gathering pool, a finishing mold carried by said table, means for permanently supporting said finishing mold in vertical alignment with the parison forming unit, and tongs transfer mechanism for transferring a parison while in neck-up position from the parison forming unit to the finishing mold.

Signed at Hartford, Connecticut, this 26th day of December, 1929.

KARL E. PEILER.